UNITED STATES PATENT OFFICE.

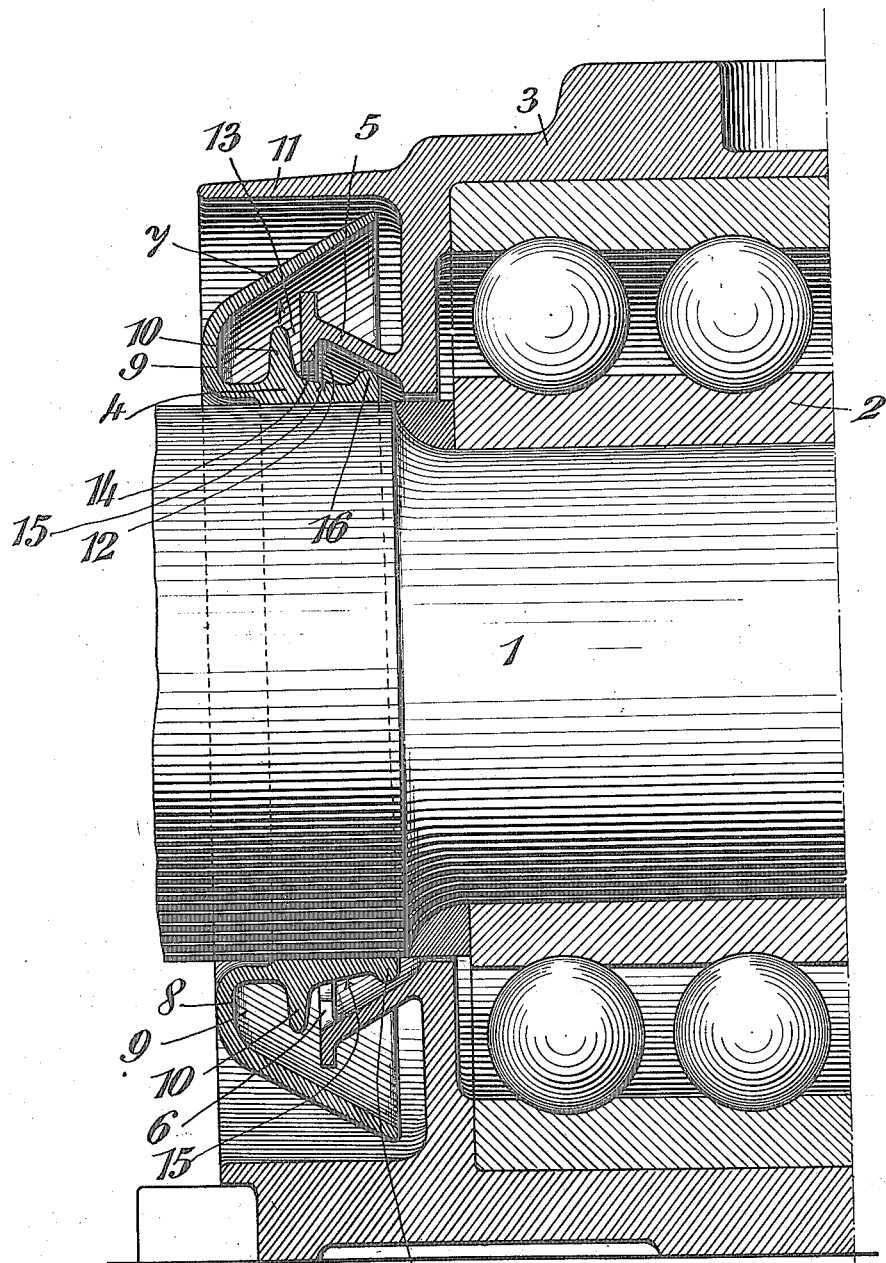

JAKOB SCHMID-ROOST, OF OERLIKON, SWITZERLAND.

DUST-GUARD.

1,145,516.

Specification of Letters Patent.

Patented July 6, 1915.

Application filed June 16, 1913. Serial No. 774,027.

*To all whom it may concern:*

Be it known that I, JAKOB SCHMID-ROOST, a citizen of the Republic of Switzerland, residing at Oerlikon, Switzerland, have invented new and useful Improvements in Dust-Guards; and I do hereby declare the following to be a full, clear, and exact description of the invention, such as will enable others skilled in the art to which it appertains to make and use the same, reference being had to the accompanying drawing, and to letters or figures of reference marked thereon, which form a part of this specification.

Packing-means for vehicles consisting of two covering bushes projecting one into the other and of which the one is fixed to the shaft and the other is stationary, are already known. The covering-bushes form a slot at the point where mud and water enter into the bearing. For the purpose of preventing the mud and water from entering into bearings of this kind provided on tramway-cars there is provided according to this invention a radial rib on the moving bush, said rib acting as a thrower-member and closing the side-entrance of the bearing, so that the mud and water which otherwise would enter between the two bushes are thrown away from the shaft.

According to this invention there can be provided on the stationary covering bush a second rib, which forms together with the thrower-rib an annular slot narrowing toward the shaft and which conveys the mud or the water getting into the side entrance of the bearing to the thrower member.

A construction according to this invention is shown in section by way of example on the accompanying drawing.

1 denotes a shaft of a tramway-car; 2 is a bearing for this shaft and 3 the casing of the bearing. The part 4 of the outer covering-bush 7 is mounted on the shaft 1, while the inner covering-bush 5 is connected to the casing 3. The inner covering-bush projects into the outer covering-bush 4, 7. Both covering-bushes are surrounded by a rim 11 of the casing 3. Between the bush 5 and the part 4 of the outer bush 7 there is provided the annular entrance slot 14. A stationary, radial rib 12 provided on the bush 5 and directed toward the shaft 1 contracts this entrance-slot 14. The lower part of this rib 12 is provided with a slot 6. In front of the entrance slot 14 there is provided on the part 4 a radial tapering rib 10, which acts as a thrower member and forms together with the part 8 of the bush 7 a groove 9. Said rib 10 covers also the entrance slot 14 and forms together with the rib 12 an annular slot 13 getting narrower toward the shaft 1.

The new and main feature of this invention consists in the provision of the thrower-rib 10 in front of the entrance-slot 14 and in the provision of the rib 12, forming together with the rib 10 the annular slot 13. Owing to the arrangement of throwing-rib 10 the mud or water getting near the entrance-slot 14 is thrown outward in the direction of the arrow shown in the drawing. Owing to the provision of the rib 12 and of the annular slot 13 getting narrower toward the shaft the mud or water already conveyed to the entrance slot 14 is brought into contact with the rib 10, *i. e.* it is fed toward this rib for the purpose of being thrown outward. The material thrown against the inner wall of the part 7 is forced, in a known manner, by the centrifugal force out of this covering bush. When the shaft 1 is stationary, the material flows in the upper part of the bush along the inner wall of the part 7 into the groove 9, flowing then out of this groove 9 in the lower part of the bush, so that it is also prevented from entering into the slot 14. If, however, mud enters through said slot 14, it is fed by the conical part 15 adjacent to bead 16 to thrower rib 10.

I claim:

1. A dust guard for vehicles comprising an outer bushing mounted on the vehicle axle consisting of a member having an annular channel whose walls diverge toward the axle bearing, an inner bushing mounted on the latter having a flange extending into said channel, and forming an annular slot between it and the inner wall of the channel, and a radial rib on said inner wall in front of the annular slot.

2. A dust guard for vehicles comprising an outer bushing, mounted on the vehicle axle, consisting of a member having an annular channel whose walls diverge toward the axle bearing, an inner bushing on the latter, having an inclined flange extending into the channel, said flange having a rib on its free end perpendicular to the axis of the bearing, and a radial rib on the inner wall of the channel in front of an annular slot formed between said inner wall and one end of the perpendicular rib, said ribs forming between them a radial slot communicating with the annular slot.

3. A dust guard for vehicles, comprising an outer bushing mounted on the vehicle axle consisting of a member having an annular channel whose walls diverge toward the axle bearing, an inner bushing on the latter having an inclined flange projecting from the inner portion of the bearing into said channel, a rib on the free end of the flange perpendicular to the axis of the bearing and forming inner and outer annular slots between its ends and the walls of said channel, a radial rib on the inner wall of the channel in front of the perpendicular rib and forming with the latter a radial slot communicating at its inner end with the inner annular slot.

4. A dust guard for vehicles, comprising an outer bushing mounted on the vehicle axle consisting of a member having an annular channel whose walls diverge toward the axle bearing, an inner bushing on the latter having an inclined flange projecting from the inner portion of the bearing into said channel, a rib on the free end of the flange perpendicular to the axis of the bearing and forming inner and outer annular slots between its ends and the walls of said channel, a radial rib on the inner wall of the channel in front of the perpendicular rib and forming with the latter a radial inwardly converging slot communicating at its inner end with the inner annular slot.

5. A dust guard for vehicles, comprising an outer bushing mounted on the vehicle axle consisting of a member having an annular channel whose walls diverge toward the axle bearing, an internal rib on the end of the inner wall of the channel, an inner bushing on the bearing having an inclined flange projecting over said rib and diverging from the inner wall of the channel, a rib on the free end of the flange perpendicular to the axis of the bearing and forming inner and outer annular slots between its ends and the walls of the channel, a radial rib on the inner wall of the channel in front of the perpendicular rib and extending substantially half way across the channel, said radial and perpendicular ribs forming a radial slot communicating with the annular slots.

6. A dust guard for vehicles, comprising an outer bushing mounted on the vehicle axle consisting of a member having an annular channel whose walls diverge toward the axle bearing, an internal rib on the end of the inner wall of the channel, an inner bushing on the bearing having an inclined flange projecting over said rib and diverging from the inner wall of the channel, a rib on the free end of the flange perpendicular to the axis of the bearing and forming inner and outer annular slots between its ends and the walls of the channel, a radial rib on the inner wall of the channel in front of the perpendicular rib and extending substantially half way across the channel, said radial and perpendicular ribs forming a radial slot communicating with the annular slots, and a flange on the bearing concentric to the axis thereof surrounding the channel.

In testimony that I claim the foregoing as my invention, I have signed my name in presence of two subscribing witnesses.

JAKOB SCHMID-ROOST.

Witnesses:
   ARNOLD LEHNER,
   CARL GUBLER.